United States Patent
Mao et al.

(10) Patent No.: US 11,753,585 B2
(45) Date of Patent: Sep. 12, 2023

(54) ORGANIC ACID SYSTEM WITH HIGH TEMPERATURE RESISTANCE

(71) Applicant: Sichuan Green & Top Technology Co., Ltd, Chengdu (CN)

(72) Inventors: Jincheng Mao, Chengdu (CN); An Chen, Chengdu (CN); Yang Zhang, Chengdu (CN); Sikai Dai, Chengdu (CN); Jinhua Mao, Chengdu (CN); Xiaojiang Yang, Chengdu (CN); Chong Lin, Chengdu (CN)

(73) Assignee: Sichuan Green & Top Technology Co., Ltd, Chengdu (CN)

( * ) Notice: Subject to any disclaimer, the term of this patent is extended or adjusted under 35 U.S.C. 154(b) by 0 days.

(21) Appl. No.: 17/554,145

(22) Filed: Dec. 17, 2021

(65) Prior Publication Data
US 2022/0106520 A1    Apr. 7, 2022

(30) Foreign Application Priority Data
Jul. 14, 2021  (CN) .......................... 202110800157.2

(51) Int. Cl.
*C09K 8/74*    (2006.01)
*B01J 31/22*   (2006.01)
*C09K 8/80*    (2006.01)

(52) U.S. Cl.
CPC ............. *C09K 8/74* (2013.01); *B01J 31/2217* (2013.01); *C09K 8/80* (2013.01)

(58) Field of Classification Search
None
See application file for complete search history.

(56) References Cited

U.S. PATENT DOCUMENTS

| | | | |
|---|---|---|---|
| 2008/0066909 A1* | 3/2008 | Hutchins | C09K 8/80 166/308.2 |
| 2016/0145483 A1* | 5/2016 | Lecerf | C09K 8/516 166/387 |
| 2016/0145486 A1* | 5/2016 | Weaver | C09K 8/40 507/260 |
| 2017/0335167 A1* | 11/2017 | Usova | E21B 33/13 |

FOREIGN PATENT DOCUMENTS

| | | |
|---|---|---|
| CN | 103224780 A | 7/2013 |
| CN | 109575905 A | 4/2019 |
| CN | 109852368 A | 6/2019 |

* cited by examiner

Primary Examiner — John J Figueroa

(57) ABSTRACT

An organic acid system with high temperature resistance, including: 80-90% by weight of a solid organic acid anhydride, 3-10% by weight of a hydrolysis catalyst, and 5-10% by weight of a stabilizer. A preparation method and an application of the organic acid system are also provided herein.

6 Claims, 3 Drawing Sheets

ORGANIC ACID SYSTEM WITH HIGH TEMPERATURE RESISTANCE

CROSS-REFERENCE TO RELATED APPLICATIONS

This application claims the benefit of priority from Chinese Patent Application No. 202110800157.2, filed on Jul. 14, 2021. The content of the aforementioned application, including any intervening amendments thereto, is incorporated herein by reference in its entirety.

TECHNICAL FIELD

This application relates to oilfield chemistry and more specifically to an organic acid system with high temperature resistance.

BACKGROUND

Fracturing-acidizing operation, abbreviated as acid fracturing, is to inject an acid fluid as a fracturing fluid at a pressure higher than the formation fracture pressure to perform the proppant-free fracturing. During the acid fracturing process, the surface of the fracture is etched to be uneven under the dissolution and etching of the acid liquid, so that after the pump is stopped and the pressure is relieved, the fracture will not be completely closed. The acid fracturing is an important production enhancement measure for carbonate oil and gas reservoirs. Generally, a hydrochloric acid or mud acid solution is injected into the formation to dissolve and erode the blockages and widen the oil and gas channels, so as to improve or restore the permeability of the formation.

The mud acid solution is a mixed solution of hydrofluoric acid and hydrochloric acid. Since the hydrochloric acid is a strong acid and the hydrofluoric acid has a high corrosivity, it is very dangerous during the transportation, storage and use. Moreover, the effective acid concentration is relatively low, leading to higher cost.

For those high-temperature oil and gas reservoirs, the conventional acid fracturing strategy often fails to arrive at the satisfactory production enhancement due to the large acid-rock reaction rate and short acid-etched fracture, which has been one of the main problems in the deep penetration and uniform reconstruction of strong heterogeneous high-temperature reservoirs.

SUMMARY

An object of this application is to provide an organic acid system with high temperature resistance to overcome the defects in the prior art that it fails to enable the deep penetration and uniform reconstruction of strong heterogeneous high-temperature reservoirs. The organic acid system of the disclosure has excellent transportation and storage safety, and is suitable for the deep acidization of the formation.

Technical solutions of the disclosure are described as follows.

The present disclosure provides an organic acid system with high temperature resistance, comprising:
80-90% by weight of a solid organic acid anhydride;
3-10% by weight of a hydrolysis catalyst; and
5-10% by weight of a stabilizer.

In an embodiment, the organic acid system comprises:
85% by weight of the solid organic acid anhydride;
7% by weight of the hydrolysis catalyst; and
8% by weight of the stabilizer.

In an embodiment, the solid organic acid anhydride is selected from the group consisting of $CH_3CH_2CH_2CH_2CCl_3NO_3$, $CF_3CF_2CF_2CF_2CCl_3NO_3$ and $CCl_3CH_2CH_2CH_2CCl_3NO_3$.

In an embodiment, the hydrolysis catalyst comprises a crown ether-metal ion complex hydrolysis catalyst.

In an embodiment, the crown ether-metal ion complex hydrolysis catalyst comprises an aza-18-crown-6 ether copper ion complex catalyst.

In an embodiment, the stabilizer is selected from the group consisting of dodecyl trimethyl ammonium chloride and cetyl trimethyl ammonium chloride.

The present disclosure also provides a method for preparing the organic acid system, comprising:
spraying a solution of the hydrolysis catalyst and the stabilizer in absolute ethanol or acetone evenly on the solid organic acid anhydride followed by drying at 40° C. to obtain the organic acid system;
wherein the organic acid system comprises:
80-90% by weight of the solid organic acid anhydride;
3-10% by weight of the hydrolysis catalyst; and
5-10% by weight of the stabilizer.

The present disclosure also provides a method for acidizing an oil field, comprising:
mixing the organic acid system with a guar gum solution in a weight ratio of (2-4):(8-6) followed by applying to an oil field to be acidized;
wherein the solid organic acid anhydride in the organic acid system is hydrolyzed into a corresponding organic acid.

Compared to the prior art, the present disclosure has the following beneficial effects.

1. The solid organic acid anhydride used in the present disclosure is non-toxic and non-volatile, and can be hydrolyzed to form an organic acid under the action of a hydrolysis catalyst in the presence of water. The residual acid of the organic acid system is basically close to neutral after the acid-rock reaction, and will not cause damage or injury to the ground pipeline and personnel after flowback, and does not need to be neutralized. Moreover, the solid organic acid anhydride exists in a form of white solid powder or granule, which is convenient for transportation and storage.

2. The stabilizer can slow down the hydrolysis reaction rate of the solid organic acid anhydride and maintain a chemical balance, so that the organic acid system can work for a long time, effectively solving the problem in the existing acid fracturing treatment that the acid-etched fracture has limited length due to the large acid-rock reaction rate.

3. The organic acid system can generate high concentration of $H^+$ under a high temperature condition to participate in an acid-rock reaction with strong heterogeneous high-temperature reservoirs, thereby realizing the remote deep acidization and the deep penetration and uniform reconstruction of strong heterogeneous high-temperature reservoirs.

DETAILED DESCRIPTION OF EMBODIMENTS

Figure 1:
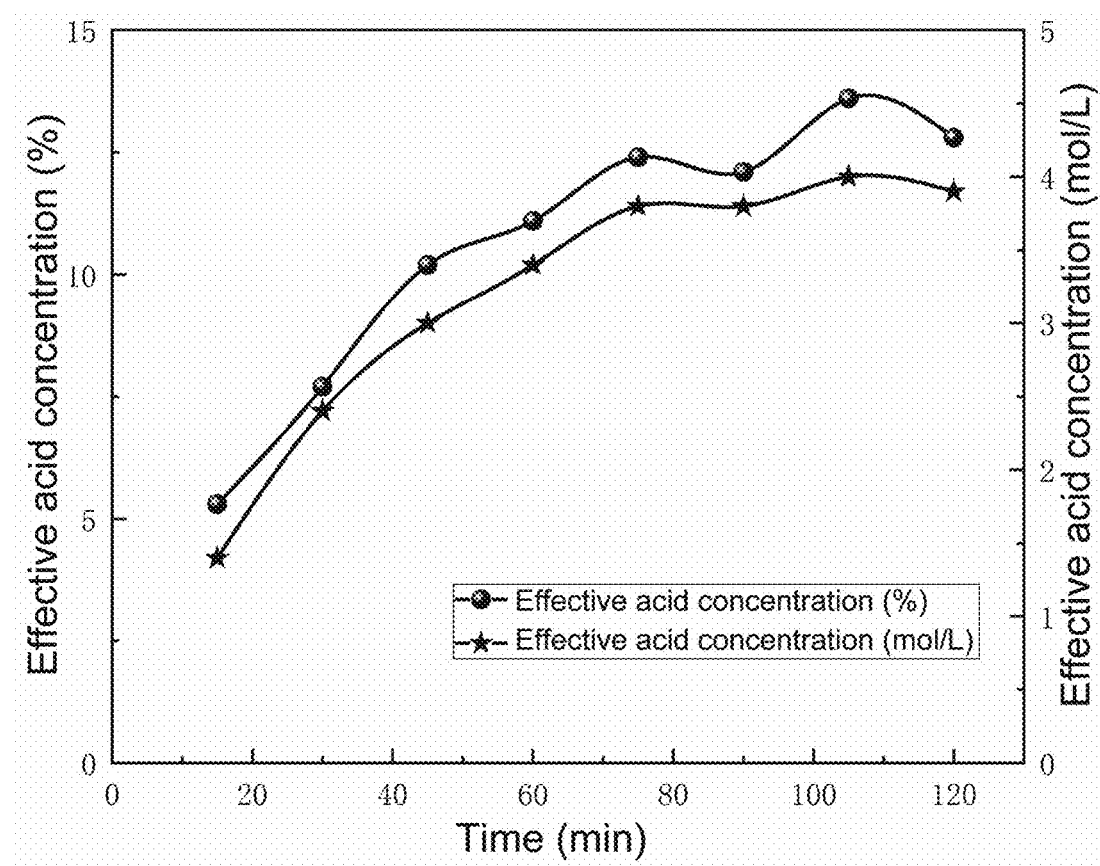
FIG. 1 shows an acid generation curve of an organic acid system obtained in Example 3 in an aqueous solution.

The technical solutions of the present disclosure will be described completely and clearly below with reference to the accompanying drawings and embodiments. Obviously, provided below are merely some embodiments of the disclosure, which are not intended to limit the disclosure. It should be understood that all other embodiments obtained by those skilled in the art based on the content disclosed herein without paying any creative effort shall fall within the scope of the present disclosure.

Unless otherwise specified, the following experiments are all performed by using conventional methods, and the materials and reagents used in the following examples are commercially available. The quantitative experiments are all performed in triplicate, and the results are expressed as mean of the three repeated experiments or mean±standard deviation.

In addition, as used herein, the "and/or" includes three solutions, for example, the "A and/or B" includes the solution A, the solution B, and a combination thereof. In addition, the technical solutions of various embodiments can be combined with each other on the premise that the combined technical solution can be implemented by a person of ordinary skill in the art.

The present disclosure provides an organic acid system with high temperature resistance, including:
80-90% by weight of a solid organic acid anhydride;
3-10% by weight of a hydrolysis catalyst; and
5-10% by weight of a stabilizer.

The solid organic acid anhydride used in the present disclosure is non-toxic and non-volatile, and can be hydrolyzed to form an organic acid under the action of a hydrolysis catalyst in the presence of water. The residual acid of the organic acid system is basically close to neutral after the acid-rock reaction, and would not cause damage or injury to the ground pipeline and personnel after flowback, and does not need to be neutralized. Moreover, the solid organic acid anhydride exists in a form of white solid powder or granule, which is convenient for the transportation and storage.

The stabilizer could slow down a hydrolysis reaction rate of the solid organic acid anhydride and maintain a chemical balance, so that the organic acid system could work for a long time, effectively solving the problem in the existing acid fracturing treatment that the acid-etched fracture has limited length due to the large acid-rock reaction rate.

The organic acid system can generate high concentration of $H^+$ under a high temperature condition through physical and chemical reactions such as permeation, solubilization, chain scission, dispersion, and complexation to participate in acid-rock reaction with strong heterogeneous high-temperature reservoirs, thereby realizing the remote deep acidization and the deep penetration and uniform reconstruction of strong heterogeneous high-temperature reservoirs.

The acid fracturing reconstruction is dependent on the conductivity and length of an acid-etched fracture. The conductivity of the acid-etched fracture is mainly associated with the amount of acid-dissolved formation components and an irregularity of the surface of the acid-etched fracture. The length of the acid-etched fracture is controlled by the fluid loss of the acid fluid, the acid-rock reaction rate and the flow rate of the acid fluid in the fracture. In the conventional acid fracturing process, an acid penetration distance is limited by the acid fluid loss and the acid consumption, and an effective action distance of the acid fluid is relatively short. Therefore, extending the length of the acid-etched fracture is considered to be an important technical tool to improve the acid fracturing process.

In some embodiments, the organic acid system includes:
90% by weight of the solid organic acid anhydride;
4% by weight of the hydrolysis catalyst; and
6% by weight of the stabilizer.

In some embodiments, the solid organic acid anhydride is selected from the group consisting of $CH_3CH_2CH_2CH_2CCl_3NO_3$, $CF_3CF_2CF_2CF_2CCl_3NO_3$ and $CCl_3CH_2CH_2CH_2CCl_3NO_3$.

In some embodiments, the hydrolysis catalyst includes a crown ether-metal ion complex hydrolysis catalyst.

In some embodiments, the crown ether-metal ion complex hydrolysis catalyst includes an aza-18-crown-6 ether copper ion complex catalyst.

The hydrolysis catalyst is capable of catalyzing the hydrolysis of the solid organic anhydrides.

In some embodiments, the stabilizer is selected from the group consisting of dodecyl trimethyl ammonium chloride and cetyl trimethyl ammonium chloride.

The stabilizer could slow down the hydrolysis reaction rate of the solid organic acid anhydride and maintain a chemical balance, so that the $H^+$ generated from the organic acid system could work for a long time.

The present disclosure also provides a method for preparing the organic acid system, which includes the following steps.

A solution of the hydrolysis catalyst and the stabilizer in absolute ethanol or acetone is sprayed evenly on the solid organic acid anhydride, and dried at 40° C. to obtain the organic acid system, where the organic acid system includes:
80-90% by weight of the solid organic acid anhydride;
3-10% by weight of the hydrolysis catalyst; and
5-10% by weight of the stabilizer.

The present disclosure also provides a method for acidizing an oil field.

In some embodiments, the organic acid system is mixed with a guar gum solution in a weight ratio of (2-4):(8-6), and applied to an oil field for acidization. The solid organic anhydride in the organic acid system is hydrolyzed into a corresponding organic acid.

Specifically, the guar gum in the guar gum solution is a kind of vegetable gum polymer. The guar gum polymer can increase the viscosity of the system, which facilitates suspending and carrying the solid organic anhydride into the formation. The water could only hydrolyze the solid organic anhydride, and fails to suspend and carry the solid organic anhydride into the formation.

Example 1

A solution of 7% by weight of an aza-18-crown-6 ether copper ion complex catalyst and 5% by weight of dodecyl trimethyl ammonium chloride in absolute ethanol was sprayed evenly on 90% by weight of $CH_3CH_2CH_2CH_2CCl_3NO_3$ and dried at 40° C. to obtain an organic acid system with high temperature resistance.

Example 2

A solution of 5% by weight of an aza-18-crown-6 ether copper ion complex catalyst and 5% by weight of cetyl trimethyl ammonium chloride in absolute ethanol was sprayed evenly on 90% by weight of $CF_3CF_2CF_2CF_2CCl_3NO_3$, and dried at 40° C. to obtain an organic acid system with high temperature resistance.

Example 3

A solution of 4% by weight of an aza-18-crown-6 ether copper ion complex catalyst and 6% by weight of cetyl trimethyl ammonium chloride in absolute ethanol was sprayed evenly on 90% by weight of $CCl_3CH_2CH_2CH_2CCl_3NO_3$, and dried at 40° C. to obtain an organic acid system with high temperature resistance.

Experimental Example

The corrosion rate of cuttings was determined as follows.
(1) Organic acid systems prepared in Examples 1-3 were respectively added with a guar gum solution to form organic acid solutions containing 20% by weight of the organic acid system. A 15% hydrochloric acid solution and the organic acid solutions were divided into two parts, respectively, each for 50 mL, and heated in a water bath at 90° C.
(2) 50 mL of the 15% hydrochloric acid solution and the organic acid solutions was respectively added with 5 g of cuttings and reacted for 20 min.
(3) After the reaction, a residual acid was filtered and a residue was collected.
(4) The residue was dried in an oven at 105° C. for 4 h to a constant weight.
(5) The corrosion rate of cuttings was determined.
The results were shown in Table 1 and FIG. 1.

TABLE 1

Comparison of corrosion rate of different solution systems

| Experimental temperature (° C.) | Time (min) | Type of solution | Corrosion rate (%) | Average corrosion rate (%) |
|---|---|---|---|---|
| 90 | 20 | 15% hydrochloric acid | 85.3 | 85.5 |
|  |  |  | 85.7 |  |
|  |  | Example 1 | 83.6 | 83.5 |
|  |  |  | 83.4 |  |
|  |  | Example 2 | 84.3 | 84.35 |
|  |  |  | 84.4 |  |
|  |  | Example 3 | 83.2 | 83.3 |
|  |  |  | 83.4 |  |

Note:
the experiments with 15% hydrochloric acid and organic acid systems of Examples 1-3 are respectively performed in duplicate.

It can be seen from Table 1 that the corrosion ability of the solution containing 20% by weight of the organic acid system prepared herein was similar to that of the 15% hydrochloric acid.

It can be seen from FIG. 1 that an effective acid concentration of a solution containing 20% by weight of the organic acid system obtained in Example 3 is less than 10% within 15 min; the effective acid concentration increases slowly after 75 min; and reaches the maximum value of 13.6% at 105 min, indicating the organic acid system obtained in the present disclosure with a strong performance of slow rate acid corrosion.

Note: the effective acid concentration refers to an effective concentration measured by a hydrogen ion concentration meter or titrated with sodium hydroxide.

At the same time, the organic acid system of Example 3 is added with the guar gum solution to prepare the solution containing 20% by weight of the organic acid system. The appearances of a rock slab before and after etching with the solution containing 20% by weight of the organic acid system are shown in FIG. 2 and FIG. 3, respectively.

Figure 2:
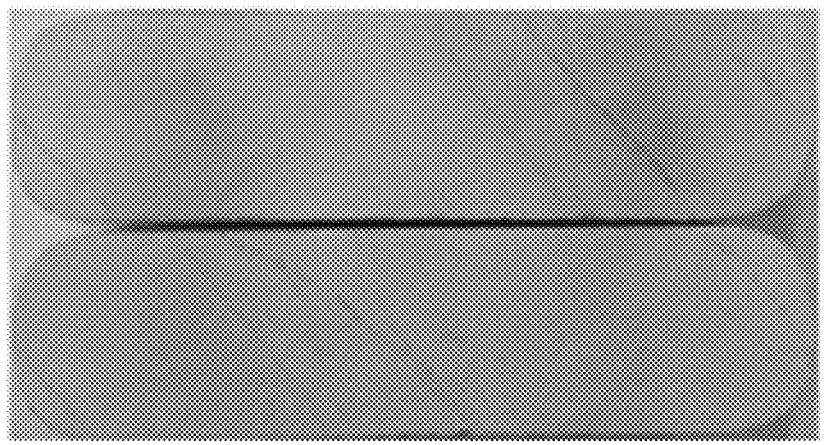
FIG. 2 shows appearance of a rock slab before etching.
Figure 3:
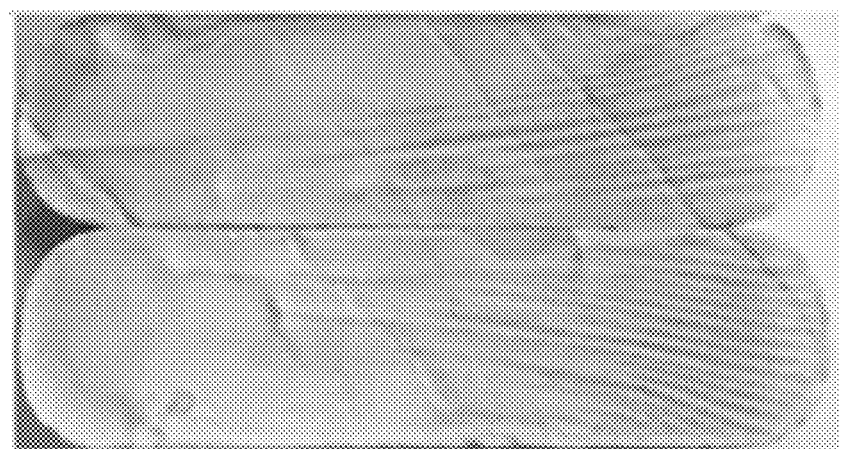
FIG. 3 shows appearance of a rock slab after etched with the organic acid system obtained in Example 3.

It can be seen from FIG. 2 and FIG. 3 that the rock slab is etched obviously after exposed to the solution containing 20% by weight of the organic acid system. The etched channel is significantly developed, and an entrance end is greatly corroded. Therefore, the organic acid system prepared herein has an excellent dissolution and etching effect.

Described above are only preferred embodiments of the present disclosure, and are not intended to limit the present disclosure. It should be understood that any modifications, replacements and improvements made by those skilled in the art without departing from the spirit and scope of the present disclosure should fall within the scope of the present disclosure defined by the appended claims.

What is claimed is:

1. An organic acid system, comprising:
   80-90% by weight of a solid organic acid anhydride;
   3-10% by weight of a hydrolysis catalyst; and
   5-10% by weight of a stabilizer;
   wherein the solid organic acid anhydride is selected from the group consisting of $CH_3CH_2CH_2CH_2CCl_3NO_3$, $CF_3CF_2CF_2CF_2CCl_3NO_3$ and $CCl_3CH_2CH_2CH_2CCl_3NO_3$.

2. The organic acid system of claim 1, comprising:
   85% by weight of the solid organic acid anhydride;
   7% by weight of the hydrolysis catalyst; and
   8% by weight of the stabilizer.

3. The organic acid system of claim 1, wherein the hydrolysis catalyst comprises a crown ether-metal ion complex hydrolysis catalyst.

4. The organic acid system of claim 1, wherein the crown ether-metal ion complex hydrolysis catalyst comprises an aza-18-crown-6 ether copper ion complex catalyst.

5. The organic acid system of claim 1, wherein the stabilizer is selected from the group consisting of dodecyl trimethyl ammonium chloride and cetyl trimethyl ammonium chloride.

6. A method for preparing an organic acid system, comprising:
   spraying a solution of a hydrolysis catalyst and a stabilizer in absolute ethanol or acetone evenly on the solid organic acid anhydride followed by drying at 40° C. to obtain the organic acid system;
   wherein the organic acid system comprises:
   80-90% by weight of the solid organic acid anhydride;
   3-10% by weight of the hydrolysis catalyst; and
   5-10% by weight of the stabilizer.

* * * * *